April 26, 1966     J. E. HARSCH ETAL     3,248,455
METHOD OF RECOVERING RESINOUS POLYMER FROM LATEX
Filed Aug. 14, 1963
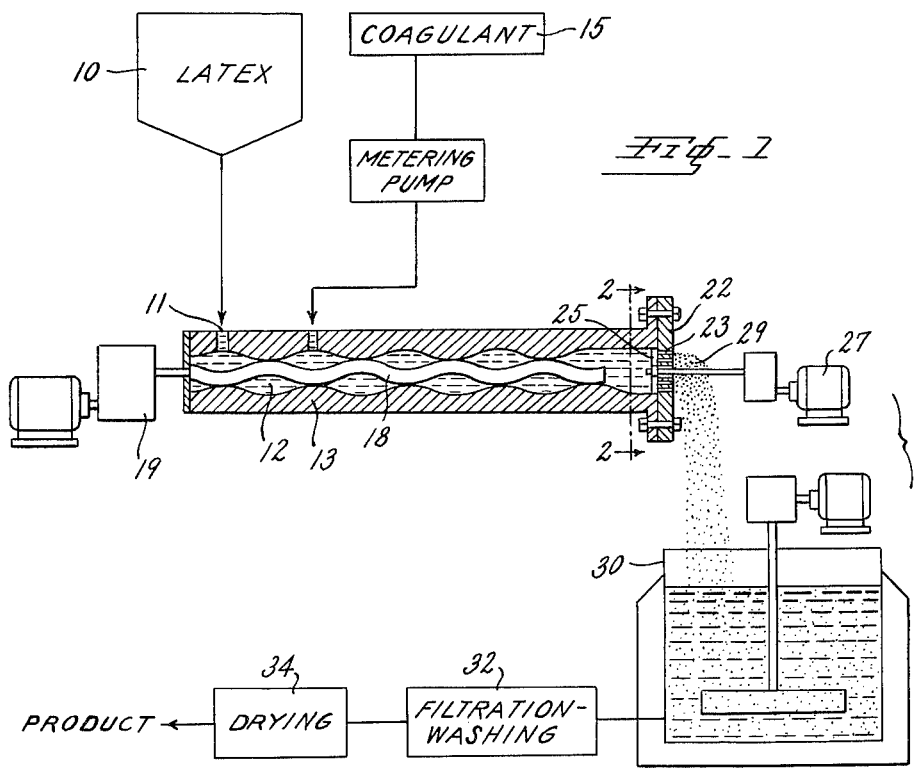
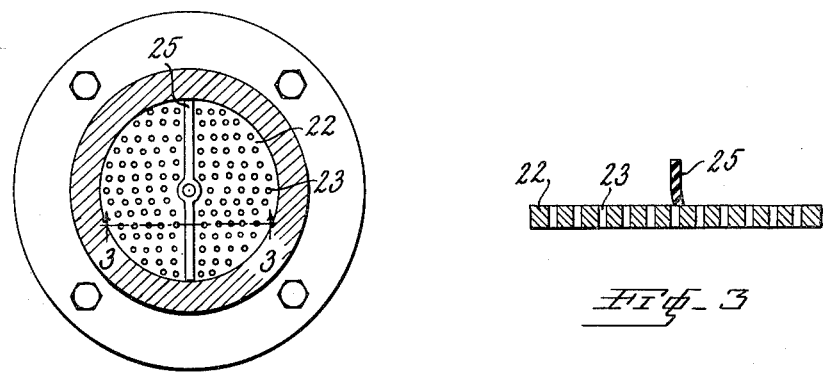
INVENTORS
JOHN E. HARSCH
CHARLES MORUSKA
ANDREW M. SMITH
TELEMAHOS G. LAINAS
ALLAN G. MURRAY
BY *James J. Long*
AGENT

United States Patent Office 3,248,455
Patented Apr. 26, 1966

3,248,455
METHOD OF RECOVERING RESINOUS POLYMER FROM LATEX
John E. Harsch, Cheshire, and Charles Moruska, Naugatuck, Conn., Andrew M. Smith, Baton Rouge, La., and Telemahos G. Lainas, Waterbury, and Allan G. Murray, Naugatuck, Conn., assignors to United States Rubber Company, New York, N.Y., a corporation of New Jersey
Filed Aug. 14, 1963, Ser. No. 302,198
4 Claims. (Cl. 260—879)

This invention relates to a process for recovering emulsion polymerized polymer from the latex in which it is prepared, and more particularly it relates to such a process involving preparing a shapable paste from the latex, shaping the paste, hardening the shape, and washing and drying the shape.

Conventional processes for coagulation and recovery of emulsion polymers are typically open to certain objections, including excessive consumption of coagulant, undue production of fines which are difficult to handle and easily lost in processing, undesirable formation of oversize particles which are hard to wash and dry properly, as well as in many cases excessive moisture content in the washed coagulum, making the drying operation undesirably expensive and unduly prolonged with consequent enhanced danger of deterioration of the polymer during such drying.

The invention has for its object the amelioration of the difficulties of conventional methods.

In accordance with the invention streams of latex and a coagulant are brought together to form a mass of material about the consistency of tooth paste. This material is then shaped into discrete bits of small size and then dropped into water where the shaped bits are hardened. The shaped pieces are then filtered, washed and dried.

The invention will be described in detail with reference to the accompanying drawing, wherein:

FIG. 1 is an essentially diagrammatic flow sheet representing one embodiment of the invention and showing in sectional elevation certain apparatus useful in the invention;

FIG. 2 is a transverse section taken along line 2—2 of FIG. 1; and

FIG. 3 is a section taken along line 3—3 of FIG. 2.

The invention has particular reference to recovery and separation of polymers, especially resinous polymers, from the emulsion or latex in which they are prepared. As is well understood by those skilled in the art, it is conventional to prepare resinous polymers, for example, resinous copolymers of styrene and acrylonitrile, by dispersing the monomer or monomers to be polymerized in an aqueous medium with the aid of a surface active agent, and polymerizing the monomer, while so dispersed, by means of a free radical polymerization catalyst, thus producing a latex of the polymer. In the latex the polymer is present as microscopic or sub-microscopic solid particles emulsified in the aqueous medium. It is well known that the emulsion can be "broken," that is, the latex can be coagulated, by the action of such coagulating agents as acids (e.g., acetic acid) or salts (e.g., calcium chloride), which results in agglomeration or flocculation of the polymer particles. The solid polymer can then be filtered off, washed and dried, after which it is packaged and sold for use.

In accordance with the invention, the disadvantages of prior processes are mitigated by continuously mixing the latex and a coagulant to form a mass of material with the consistency of tooth paste. The paste is a uniform mix made up of the entire water content and solids content of the latex, plus the coagulant. There is no separation into a watery serum and agglomerates of solids, such as occurs upon coagulation of a rubber latex. In order to obtain a paste having the desired formable consistency it is necessary that the solids content of the latex and the volume of the coagulant liquid be such that the resulting mixture has a relatively high solids content. Thus, a mixture or paste having a solids content of at least 25–30% is usually formable, but the minimum solids permissible in any given case depends on a number of other factors such as the particular polymer being processed, the size of the latex particles, the nature of the coagulant, etc. If the latex has a relatively high solids content in the first instance, then a relatively dilute coagulant in relatively large amount can be used if desired. However, if the solids content of the latex is comparatively low, it is necessary to use a concentrated coagulant liquid, in suitable small amount. It will also be understood that the concentration of the coagulant will vary with the type of coagulant. Mixing of the latex with the coagulant to form the desired formable paste may be accomplished in a variety of ways. A preferred method involves bringing the two liquids (latex and coagulant) together in a chamber of a positive displacement pump wherein the liquids are thoroughly blended but the paste is not subjected to violent mixing or shearing action, that is, there is no tendency to homogenize or grind the paste or break down its structure into fine particles. Preferably this is accomplished with the aid of a Moineau type of pump, as will be described in more detail below. Alternatively the latex, and the coagulant in the form of an atomized stream, may be mixed on a vibrating conveyor. If desired the latex and atomized coagulant may be blended in a twin screw conveyor. In another method, mixing of the latex and atomized coagulant may be accomplished in a twin paddle mixer, care being taken not to overmix the paste (i.e., break down the structure). Similarly the latex and coagulant (atomized) may be mixed in a ribbon flight conveyor.

The positive displacement or positive pressure to which the present paste is subjected is normally about 10 to 20 p.s.i.

The invention contemplates extrusion of such paste through a fine orifice to form a thin (e.g. $\frac{1}{100}$ to $\frac{1}{4}$ inch in diameter, as well as larger sizes, depending on the size of the orifice) rod or strand. Such rod or strand has the same composition as the paste, that is the rod or strand contains in uniform admixture the entire solids content and water content of the latex and coagulant which were mixed together to form the paste in the first instance. It has been found that although it is usually not practical to force the paste through such fine orifices with the aid of displacing pressure alone, it is possible to force the paste through such an orifice if the paste is subjected to a smearing action as it enters the orifice, that is, if the paste is broken up, by means of a wiping blade or roller or the like, just prior to the orifice. If the passage of the paste into the orifice is thus continually momentarily interrupted by transverse, wiping across the path of flow of the paste, it is surprisingly found that the paste can be passed even through exceptionally fine orifices.

In typical practice of the invention the resulting shaped strands or rods are dropped into gently agitated hot water, the rods breaking up into short lengths (e.g. 1/100 to 1/2 inch long depending on the size of the orifice). These bits of rods are subjected in the hot water first to a temperature that is at or below (usually 5° to 30° F. below) the minimum softening temperature of the polymer (by softening temperature in this context is meant a softening or agglomerating temperature such as might be determined by the method described in U.S. Patent 2,615,206). The effect of this is to slowly initiate the dewatering and hardening of the particles. If the particles are put into water markedly above the agglomeration temperature they will remain soft and will not dewater to the minimum possible. Thereafter, the temperature of the water is raised to somewhat above (usually 5° to 30° F. above) the softening temperature of the resin. The effect of this is to complete hardening and dewatering of the particles. It will be understood that instead of raising the temperature of the water, the particles may be transferred from the first bath to a second bath at higher temperature, or the water in the bath may be changed.

The resulting particles are easily washed, separated and dried with great efficiency and with little or no loss in the form of fines.

As indicated, the invention has particular applicability to resinous polymers. Among these may be mentioned the homopolymers and copolymers of styrene (and equivalent homologs and substitution products thereof such as dichlorostyrene and alpha-methyl styrene) acrylonitrile (and equivalents thereof such as methacrylonitrile), alkyl acrylates and alkylacrylates such as ethyl acrylate and methyl methacrylate, acrylic acid and the like, vinyl chloride, vinyl acetate, etc. Compositions of polymers containing a substantial amount, e.g., 40% or more, of resinous polymer may be employed. Thus, latex blends in which the polymer content is 40% (all quantities are expressed herein by weight unless otherwise indicated) or more of a resin (e.g. styrene-acrylonitrile resin) and 60% or less of a rubber (e.g. butadiene-acrylonitrile copolymer rubber) may be employed in the invention. Similarly graft copolymer latex containing appreciable resin may be employed, e.g., a latex of a graft copolymer of 40% or more of resin forming monomers (e.g., a mixture of styrene and acrylonitrile) graft polymerized on correspondingly 60% or less of a rubber (e.g., polybutadiene or butadiene copolymer) in latex form, may be used. Latex blends of graft copolymer with 10% to 90% of separately prepared resin to increase the total resin content to 40% or better may also be used.

Usually the latex (or blend of latices) used in the invention will contain 20 to 45% solids, and will have average particle sizes ranging from 500 to 3,000 Angstroms. The coagulants that may be employed include not only acetic acid (which may be used either in concentrated form (100%) or in dilute aqueous form, as low as 1% for example) but also other acids such as carbonic acid, sulfurous acid, oxalic acid, sulfuric acid, phosphoric acid, etc., as well as such salts as calcium chloride, alum, etc., conveniently in aqueous solution. It will be understood that it is the final solids content which is important in paste formation. Typically we use a small amount of concentrated coagulant. The solids content of the paste is rarely more than 20% below the solids content of the latex.

The relative proportions of latex and coagulant should be such, as pointed out previously, to provide at least about 30% solids in the coagulated slurry, so that the slurry will be a paste. If desired a latex of 45% solids can be blended with one of 20% solids to an average solids content of 30%. Also, we can use a latex with small particle size and obtain a paste at 20% solids.

In one aspect, the invention is directed to mixing the resinous polymer latex and coagulant by simultaneously passing properly metered streams of latex and coagulant into a pumping device, preferably a positive-displacement type of pumping device capable of delivering material positively at a smooth rate, such as a gear pump or similar pump, preferably a pump based on the Moineau type of screw or gear. The previously described paste-like mass is formed in such pump, where the streams of latex and coagulant mingle. The delivery end of such pump may be fitted with a suitable shaping device, such as a die plate containing one or more orifices, or a screen having openings of suitable size, or the like. It is a peculiarity of many of the pasty latex-coagulant mixes that it is scarcely possible, even with the aid of a positive displacement pump, to force the paste through a fine opening. The invention overcomes this difficulty by exerting a kind of smearing action or wiping action on the paste at the place where it enters the orifice. This may be accomplished by repeatedly passing a blade or roller or the like, preferably made of relatively soft, flexible material, such as rubber, across the entrance to the orifice, in such manner as to continually interrupt the flow of paste as it passes into the orifice. This has the effect of permitting the material to pass through the orifice, possibly by disturbing bridges of paste formed across the orifice. It is desired to emphasize that such wiping device must be located at the entrance side of the orifice, since it is not effective for the intended purpose if located at the exit or discharge side of the orifice.

It is desired to emphasize that the mixing device must not homogenize the paste, that is, it should over-mix the paste or exert an actual grinding action on it, otherwise the particles formed will be weak and will tend to disintegrate with consequent formation of fines, making washing and filtering difficult and leading to excessive losses of polymer.

It is also desired to emphasize that the delivery of the paste to the screen or orifices under positive pressure, such as exists in the chamber of a Moineau type of pump, enhances the strength of the particles and imparts enhanced resistance to degradation of the shaped particles. The following example will serve to illustrate the practice of the invention in more detail.

*Example*

The latex used in this example is a styrene/acrylonitrile (72/28) resinous emulsion copolymerizate. It contains 42% solids and has an average particle size of 2000 Angstroms. The coagulant employed is 5% acetic acid (i.e. 5 parts by weight of acetic acid and 95 parts by weight water). Referring to the drawing, latex is fed continuously from a latex supply tank 10 into the entrance 11 of the chamber 12 of a Moineau type of pump 13. A separate stream of the coagulant is fed continuously from a supply tank 15 to a point in the chamber 12 slightly spaced downstream from the entrance 11 where the latex enters. The relative rates of latex and coagulant are such as to provide 1.4 pounds of glacial acetic acid to 100 pounds of polymer. The latex and coagulant come together in the chamber 12 of the pump. The pump has the usual axially mounted rotor 18 suitably driven by a driving mechanism 19, and the rotor 18 and chamber 12 are of such shape that the material in the chamber is moved downstream toward the discharge end of the pump under positive pressure by the action of the rotor. The operation of the pump is such that a low or mild mixing action takes place, although such mixing is such as to make efficient and effective use of the coagulant, that is, all parts of the latex are contacted with coagulant and vice versa so that a uniform mix results and little excess coagulant is used. At the same time the composition is not overmixed, that is, there is no excessive shearing or intense grinding such as would homogenize the resulting paste or break down its structure. The mixture produced in the pump has the tooth paste-like consistency described previously. It has about 40% solids content. The throughput is about 120 pounds polymer per hour (about 40 gallons of latex). The exit end of the pump has a screen or die plate 22 containing numerous small holes or orifices 23 (0.20 inch in diameter, for example). Positioned against the die plate or screen on the inside of the pump is a flexible blade 25, which is rotated at a speed of 300 r.p.m. for example, by a motor 27, and which smears the paste against the orifice. The paste thus passes, under the influence of the positive pressure (e.g., 10–20 p.s.i.) exerted in the mixing chamber 12, directly into the shaping orifices which form the exit from such chamber. It will be understood that the described operation is such that the paste retains its smooth, uniform structure, from the time it is formed in the mixing chamber 12 until the time it emerges from the die orifices 23, that is, there is no break-down of paste structure (i.e., no separation into a watery serum and agglomerates of solids) but the water is simply retained in the paste so that the water content of the paste as formed in the mixing chamber 12 is the same as the water content of the paste upon emerging from the die orifices 23. The paste emerges in thin strands 29 which fall down into a tank 30 of gently agitated hot water. The strands break up into short lengths ($\frac{1}{16}$ to $\frac{1}{8}$ inch long) forming a slurry in the hot water. It is important that the agitation be gentle in order that the particles are not smashed by the agitation, with the undesirable result that fines would be produced, and subsequent dewatering and separation could not be accomplished efficiently. In this example the temperature of the water is about 185° F., which is at or slightly below the softening temperature (agglomeration temperature or syneresis temperature) of the resin. When all of the batch has passed through the pump, the temperature of the water in the tank 30 is raised to about 205° F., which is above the softening temperature of the resin. The effect of this is to harden the particles, and to reduce the moisture content of the particles as well as to leach out a portion of the water-soluble impurities. The resulting slurry (which contains one pound of polymer particles in about one gallon of water) is then passed to a conventional filtering and washing device 32 (e.g., a rotary filter or counter-current washer) where the solids are separated. The moisture content of the filtered off or separated solids is only about 20%, as compared to a typical value of 30% in a filter cake obtained in conventional practice. The material is thereafter passed through a rotary dryer 24 or the like, in which the moisture content is reduced to about 1%. The dried material is remarkable for its substantial freedom from excessively small particles (fines) as well as excessively large particles. The following table compares the results obtained with the invention to those obtained in a typical prior practice.

|  | Conventional | Invention |
| --- | --- | --- |
| Coagulant consumption (pounds per pound of polymer) | .024 | .014 |
| Percent of dry material passing through a 200 mesh (e.g., U.S. series) screen | 10 | 1 |
| Percent of dry material remaining on a 20 mesh screen | 10 | 1 |
| Moisture content of particles entering dryer (percent on wet basis) | 30 | 20 |

It is an outstanding advantage of the method of the invention that the formation of a material with essentially no fines (not more than 4%, preferably not more than 2%, under 200 mesh) before washing makes possible the use of simpler, more efficient counter-current extractors rather than rotary drum filters. The formation of a material without fines also permits use of a centrifuge for separation of liquid from the solid. This is more economical and more efficient than conventional practices.

It is desired to emphasize that the production of a shaped particulate material that is substantially free of fines is made possible by that feature of the invention whereby the particles as originally shaped have sufficient structural strength to remain integral during the operations of syneresis (hardening or agglomeration in hot water) and washing. Important considerations in the production of shaped particles which resist disintegration in subsequent processing include the manner of formation of the paste in a mixing device which does not exert a grinding or homogenizing action on the paste, as well as the subjecting of the paste to positive pressure in the mixing chamber. The delivery of the paste under positive pressure directly to shaping orifices in direct communication with the mixing chamber is also a significant feature in this respect.

Although fines as such are undesirable (meaning typically particles of less than 200 mesh size) it is at the same time an important feature of the invention that the shaped particles are not unduly large. In this respect, the feature of the wiping action exerted on the positively pressurized paste as it enters the shaping orifices is highly advantageous, since such wiping action enables the relatively thick and viscous paste to be extruded in desirable small shapes as distinguished from large shapes. Thus, the procedure described enables shaped bits having a maximum dimension of ¼ inch to be formed readily, and in fact shaped material having only relatively few particles larger than 20 mesh (not more than 4%, preferably not more than 2%) are easily formed by the method of the invention. This means that unusually efficient washing is possible, since large particles are hard to wash properly. It also means that the drying operation can therefore be accomplished expeditiously. Excessively large particles take a long time to dry and they tend to case harden on the outside; also, the prolonged or severe drying conditions necessary with excessively large particles tend to lead to deterioration of the polymer during drying.

Having thus described our invention, what we claim and desire to protect by Letters Patent is:

1. A method of recovering a resinous polymer from a latex in which said polymer has been prepared by emulsion polymerization comprising passing a stream of said latex into an entrance of a chamber of a positive displacement pump, which chamber constitutes a mixing chamber, separately passing a stream of liquid coagulant into said mixing chamber at a point spaced downstream from said entrance, mixing the said latex and coagulant in said chamber, the solids content of the latex and the concentration of the coagulant being such that the resulting mixture has the consistency of a shapable paste, subjecting the paste to positive pressure while advancing it through said mixing chamber and while subjecting it to a gentle mixing action to produce a uniform paste without exerting abrading action on the paste, passing the resulting uniform paste under positive pressure of 10 to 20 p.s.i. directly from said mixing chamber into shaping orifices, exerting a wiping action on the paste as it enters the orifices, to shape the paste into particles of uniform desired size containing the entire water content and solids content of the said latex and coagulant, depositing the shaped particles in water heated to a temperature within the range from 30° F. below the softening temperature of the polymer to the said softening temperature, gently agitating the particles in said water, thereafter immersing the particles with gentle agitation in water heated to a temperature from 5° to 30° F. in excess of the softening temperature of the polymer whereby the particles harden and become structurally denser and decrease in moisture content, removing the particles, and washing and drying the same, the said resinous polymer being a composition selected from the group consisting of (A) resinous copolymer of styrene and acrylonitrile,
(B) graft copolymer of at least 40% of styrene and acrylonitrile on correspondingly not more than 60% of polybutadiene, and
(C) blend of (A) and (B)

2. A method as in claim 1 in which the said paste has a solids content of at least 30%.

3. A method as in claim 2 in which the said particles have sizes ranging from 1/100 of an inch to ¼ inch.

4. A method as in claim 2 in which not more than 4% of the particles have a size smaller than 200 mesh, and not more than 4% of the particles have a size greater than 20 mesh.

References Cited by the Examiner

UNITED STATES PATENTS

| | | | |
|---|---|---|---|
| 2,371,722 | 3/1945 | Wanderer | 260—96 |
| 2,650,912 | 9/1953 | Hutchinson | 260—93.5 |
| 3,008,940 | 11/1961 | Wagner et al. | 260—96 |

OTHER REFERENCES

Condensed Chemical Dictionary, Reinhold Publishing Corp. (N.Y.), 1956, page 979.

JOSEPH L. SCHOFER, *Primary Examiner.*

DONALD E. CZAJA, *Examiner.*